(12) United States Patent
Jeyarajan

(10) Patent No.: US 8,348,093 B2
(45) Date of Patent: Jan. 8, 2013

(54) SYSTEM METHOD AND APPARATUS FOR MEDICATION SCHEDULING

(76) Inventor: Angelo Jeyarajan, Middleton, MA (US)

( * ) Notice: Subject to any disclaimer, the term of this patent is extended or adjusted under 35 U.S.C. 154(b) by 310 days.

(21) Appl. No.: 12/800,320

(22) Filed: May 12, 2010

(65) Prior Publication Data

US 2011/0190928 A1    Aug. 4, 2011

Related U.S. Application Data

(60) Provisional application No. 61/337,255, filed on Feb. 1, 2010.

(51) Int. Cl.
G07F 11/00 (2006.01)
(52) U.S. Cl. .............................. 221/15; 221/3
(58) Field of Classification Search .............. 221/3, 7, 221/15
See application file for complete search history.

(56) References Cited

U.S. PATENT DOCUMENTS

| | | | |
|---|---|---|---|
| 4,367,955 A | 1/1983 | Ballew | |
| 4,662,537 A | 5/1987 | Wolf et al. | |
| 4,939,705 A * | 7/1990 | Hamilton et al. | 221/2 |
| 5,011,032 A * | 4/1991 | Rollman | 221/4 |
| 5,239,491 A * | 8/1993 | Mucciacciaro | 221/15 |
| 5,313,439 A | 5/1994 | Albeck | |
| 5,377,614 A | 1/1995 | Glazer | |
| 5,520,307 A * | 5/1996 | Miller et al. | 221/2 |
| 5,571,661 A * | 11/1996 | Ishige et al. | 430/544 |
| 5,720,392 A | 2/1998 | Price | |
| 6,324,123 B1 | 11/2001 | Durso | |
| 6,667,936 B1 | 12/2003 | Ditzig | |
| 6,707,763 B2 * | 3/2004 | Osberg et al. | 221/2 |
| 7,004,324 B1 | 2/2006 | Delorio | |
| D525,538 S | 7/2006 | Oas | |
| 7,081,807 B2 | 7/2006 | Lai | |
| 7,236,428 B1 | 6/2007 | Morse | |
| 7,532,544 B2 | 5/2009 | Morse | |
| 7,734,374 B2 * | 6/2010 | Dallman | 700/236 |
| 7,907,477 B2 | 3/2011 | Puzia | |
| 7,978,564 B2 * | 7/2011 | De La Huerga | 221/15 |
| 8,102,735 B2 * | 1/2012 | Morse | 221/2 |
| 2008/0165623 A1 | 7/2008 | Morse | |
| 2009/0223994 A1 | 9/2009 | Getz | |

* cited by examiner

*Primary Examiner* — Timothy Waggoner
(74) *Attorney, Agent, or Firm* — Bergman & Song LLP; Michael Bergman

(57) ABSTRACT

A dispensing kit for medicine bottlecaps that includes a first bottlecap with a first preprogrammed timer programmed for a first time interval, a second bottlecap with a second preprogrammed timer programmed for a second time interval and a dispensing device for independently dispensing the first and second bottlecaps.

16 Claims, 7 Drawing Sheets

SYSTEM METHOD AND APPARATUS FOR MEDICATION SCHEDULING

CROSS-REFERENCE TO RELATED APPLICATIONS

The present application claims the benefit of U.S. provisional patent application Ser. No. 61/337,255 filed on Feb. 1, 2010, the disclosure of which is herewith incorporated by reference in its entirety.

FIELD OF THE INVENTION

The present invention relates to systems, methods and apparatus for medicine dose administration, and more particularly to systems, methods and apparatus for the timing of medicine dose administration.

BACKGROUND

The effectiveness of a medication regime often depends on maintaining appropriate corporeal concentrations of the medication which, in turn, is affected by regular dose administration. In a supervised setting, where a medical practitioner is responsible for administering medicine, providing doses at appropriate times can be reliably achieved. Outside of such environments, even the most sophisticated and diligent patient may find it difficult to reliably self administer medications on schedule.

In light of this issue, a variety of medication timers have previously been proposed. For example, U.S. Pat. No. 4,662,537 describes a keyboard assembly which stores and dispenses pills and an electronic assembly which records data regarding key closures whenever a pill is dispensed.

U.S. Pat. No. 5,313,439 shows an ordinary medicine bottle with a cap modified so as to include a timer, a battery, a buzzer or display light and means for closing a circuit. When the cap is closed, the circuit is automatically closed through contact with a conducting material on the upper edge of the bottle.

U.S. Pat. No. 5,377,614 shows a reminder device with circular dials similar to the face of a clock for pill and medicine containers. The rotatable dials may be manually set to an indicator showing the weekday, date and time for taking a pill or other medicinal dose. The reminder device is disposable and maybe pin to the bottle top or other medicine container.

U.S. Pat. No. 6,324,123 describes a medication timer for tracking when medication is to be taken. The medication timer includes a bottle for housing the medication. The bottle has an open end which has a lip. The lip has threads formed thereon. A first cap for removably closing the bottle has a first portion and a second portion. The first and second portions are generally annular. The first and second portions each have an interior threaded surface. A timer for tracking medication use has a top wall, a bottom wall and a peripheral side wall extending therebetween. The peripheral side wall has threads thereon. The peripheral side wall has a plurality of bores therein. Control circuitry is fixedly mounted in an interior of the timer. The control circuitry is adapted for tracking elapsing time, and adapted for activation of an alarm. A display for displaying information from the control circuitry is mounted on the control circuitry. The display is operationally coupled to the control circuitry. A button for programming the control circuitry is in each one of the bores in the timer.

U.S. Pat. No. 7,081,807 describes an electronic pill reminder device. The reminder device can be retrofitted inside a conventional pill bottle cap between the bottle cap and the bottle container. When the user closes the pill bottle cap on the bottle container, the electronic timer, with factory predetermined time interval, is automatically activated. That activated timer will generate alert signals not only remind user last pill has taken but also to remind the user to take his/hers next dose at time-out. The reminder device and alert signals are automatically deactivated and reset when the user opens the pill bottle cap (to take contents from the bottle container).

Similarly, US published patent application number 2009/0052283 describes a disposable electronic timer in the form of a disk having a liquid crystal or similar display, adapted to be glued to a medication bottle cap. A lower major surface of the timer has an adhesive layer with a cover that can be peeled off to expose the adhesive so that the timer can be secured to the bottle cap. The upper major surface of the timer contains the timer display and a control button that in one mode starts the timer so that an alarm within the timer sounds after a preset time interval, and in another mode sets or resets the timer to a different preset time interval. Operating power is supplied by a battery within the timer.

Each of the above-noted documents is herewith incorporated by reference in its entirety.

SUMMARY

The various references listed above show that the need for an effective means of reminding a patient of a medication schedule has long been known. Nevertheless, the solutions proposed date have been less than effective. In considering this circumstance, the inventor of the present invention has come to understand the deficiencies of the previous technology, and has developed new and surprisingly effective approaches to addressing this problem.

In particular, through diligent effort, the inventor has understood that an effective medication reminder device according to the invention is adapted to provide a patient reminder with a minimum of effort on the part of the patient, a caregiver, and a dispensing pharmacy. Unlike the previous approaches, the present invention includes a medicine container and/or dispensing device including a preprogrammed timer device. By providing a preprogrammed timer device, a minimum of sophistication and diligence on the part of the ultimate recipient of the medication.

In various aspects of the invention, the pre-programming can be done at one or more of the facility of a timer device manufacturer, the facility of a medicine cap manufacturer, the facility of a medicine bottle manufacturer, the facility on a pharmaceutical manufacturer, and the facility of a dispensing pharmacy. In like fashion, a dispensing device and/or a dispensing kit according to the invention can be utilized at one or more of the facility of a medicine cap manufacturer, the facility of medicine bottle manufacturer, the facility on a pharmaceutical manufacturer, and the facility of a dispensing pharmacy.

Regardless of where employed, by providing packaging with pre-programs timers, the effort of a downstream user and the opportunity for undesirable and dangerous improper programming is produced.

These and other advantages and features of the invention will be more readily understood in relation to the following detailed description of the invention, which is provided in conjunction with the accompanying drawings.

It should be noted that, while the various figures show respective aspects of the invention, no one figure is intended to show the entire invention. Rather, the figures together illustrate the invention in its various aspects and principles. As such, it should not be presumed that any particular figure

DETAILED DESCRIPTION

Figure 1:
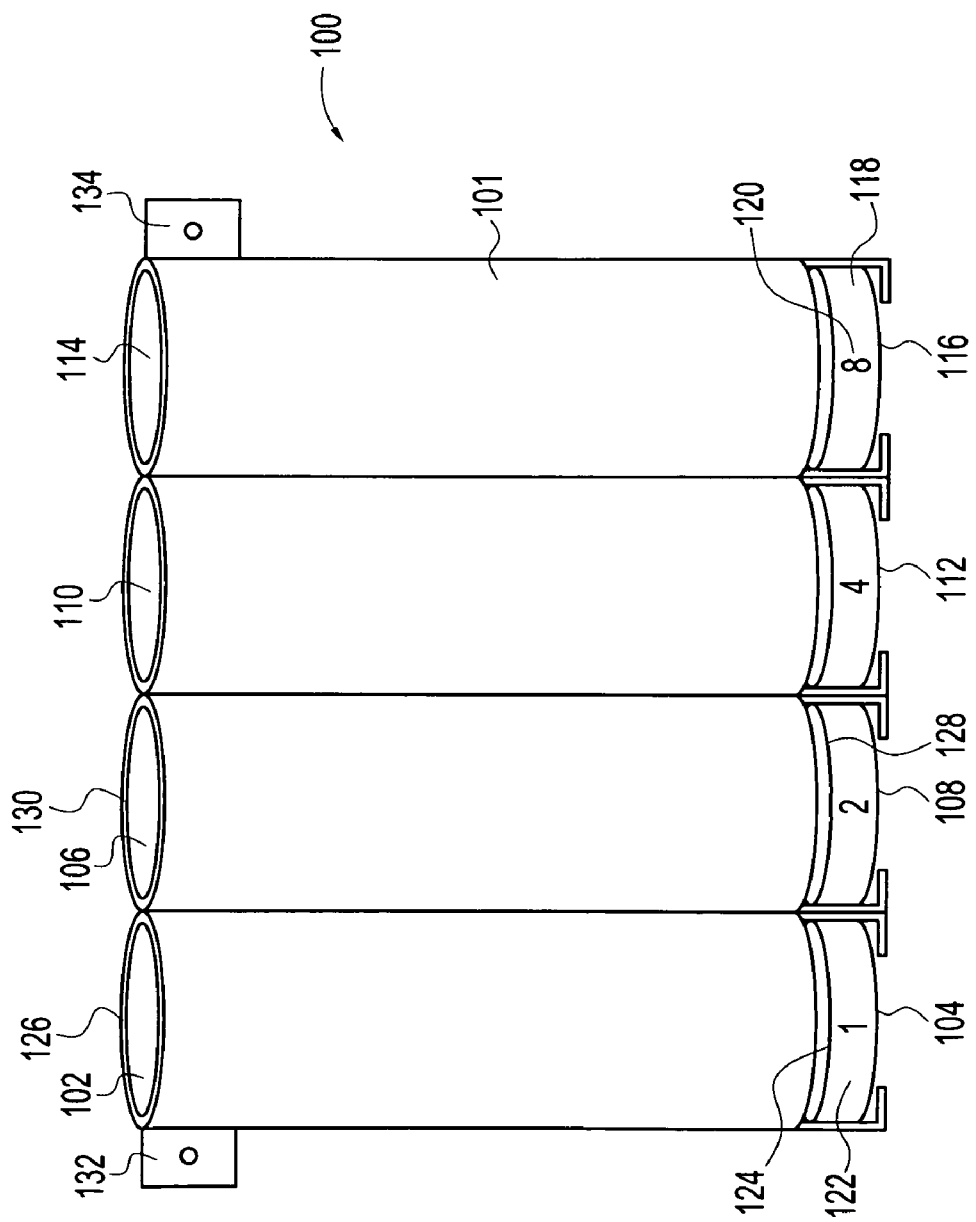
FIG. 1 shows, in schematic perspective view, a dispensing device according to one aspect of the invention.

The following description is provided to enable any person skilled in the art to make and use the disclosed invention and sets forth the best modes presently contemplated by the inventor of carrying out his invention. In the following description, for purposes of explanation, numerous specific details are set forth in order to provide a thorough understanding of the present invention. It will be apparent, however, to one skilled in the art that the present invention may be practiced without these specific details. In other instances, well-known structures and devices are shown schematically or in block diagram form in order to avoid unnecessarily obscuring the present inventions.

As noted above, the invention includes a system, method and apparatus for providing a pre-programed timer-enabled enclosure for a medicine. In certain embodiments, the pre-programmed timer-enabled aspect of the enclosure includes a cap having an integrated pre-programmed timer.

Unlike previously known devices, a particular timer-enabled unit is provided during manufacturing, or thereafter, with a preset time interval. Consequently, a unit according to the present invention can be provided to a patient of very limited technical ability and manual dexterity. In addition, a unit according to the present invention requires a minimum of effort on the part of a pharmacist or other dispensing medical practitioner. There is consequently realized an improvement in dispensing efficiency, and a reduced likelihood of practitioner error, as compared with conventional devices.

In one aspect, the invention includes a pill bottlecap having a fixedly preprogrammed time interval of four hours. In another aspect, the invention includes a pill bottlecap having a fixedly preprogrammed time interval of six hours. In another aspect, the invention includes a pill bottlecap having a fixedly preprogrammed time interval of eight hours. In another aspect, the invention includes a pill bottlecap having a fixedly preprogrammed time interval of 12 hours. In still another aspect, the invention includes a pill bottlecap having a fixedly preprogrammed time interval of 24 hours. In a further aspect, the invention includes a pill bottlecap fixedly programmed in a fractional hour time interval.

In a further aspect, the invention includes a reprogrammable pill bottlecap adapted for programming to annunciate at time intervals of four hours, six hours, eight hours, 12 hours and 24 hours according to an entered program value. In a further aspect, the invention includes a pill bottlecap reprogrammable in a fractional hour time interval.

In one embodiment, the invention includes a pill bottlecap having six perforations for sound transmission, an LED light source and a button. In one aspect, the invention includes a bottlecap with a threaded coupling. In another aspect, the invention includes a bottlecap with a bayonet coupling, and it still another aspect the invention includes a bottlecap with a childproof coupling.

As will be further described and illustrated below, in certain embodiments of the invention, a collection of pre-programmed timer-enabled units are received at a pharmacy or other dispensing location in the form of a pre-charged kit. The kit includes a dispensing apparatus that allows ready selection of a unit having a pre-programmed time interval appropriate to a particular medicinal regime.

FIG. 1 shows, in schematic perspective view, a dispensing kit 100 according to one exemplary embodiment of the invention. According to the illustrated embodiment, kit 100 includes a dispensing device 101 having a plurality (here four) of cavities e.g., 102 adapted to hold respective pre-programmed timer-enabled medicine bottle caps e.g., 104.

As shown in the illustrated embodiment, the first cavity 102 is adapted to hold a bottle cap 104 having a preprogrammed dispensing frequency of one per day (i.e., every 24 hours). A second cavity 106 is adapted to hold a bottle cap 108 having a preprogrammed dispensing frequency of two per day (i.e., every 12 hours). A third cavity 110 is adapted to hold a bottle cap 112 having a preprogrammed dispensing frequency of four-per-day (i.e., every six hours) and a fourth cavity 114 is adapted to hold a bottle cap 116 having a preprogrammed dispensing frequency of eight per day (i.e., every three hours).

According to one aspect of the invention a peripheral skirt 118 of a preprogrammed bottle cap according to the invention is marked with indicia 120, here a numeral "8," corresponding to the dispensing frequency preprogrammed in that cap.

According to certain aspects of the invention, a bottle cap according to the invention has a characteristic adapted to exclude it from any cavity of the dispensing device 101 except for the cavity properly adapted to receive caps programmed with the correct dispensing interval. Thus, for example, illustrated bottle cap 104 includes a skirt 122 having a peripheral edge 124 that defines a circle of a substantially specific diameter. A corresponding aperture 126 has a specific diameter substantially equivalent to that of the skirt 122.

A corresponding skirt and peripheral edge 128 of bottle cap 108 has a different diameter that is consistent with, and adapted to fit within, the diameter of aperture 130.

Figure 2:
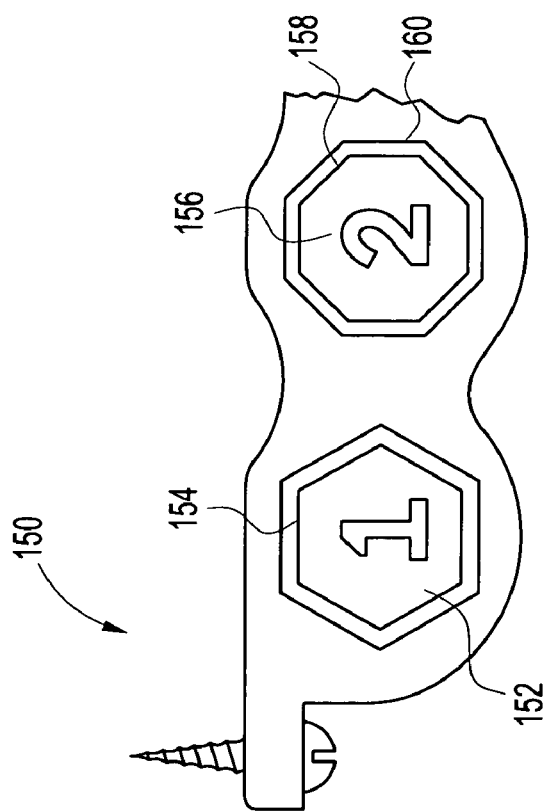
FIG. 2 shows, in schematic top view, a dispensing device and a bottle cap according to a further aspect of the same invention.

FIG. 2 illustrates an exemplary dispensing unit 150 and a bottle cap distinguished by having a skirt with a peripheral edge with a specific geometric shape. Thus, for example, a once-per-day bottle cap 152 includes a skirt with a hexagonal periphery 154, whereas a twice-per-day bottlecap 156 includes a skirt having an octagonal periphery 158. It will be evident to one of skill in the art that the bottlecap 152 will not be received within octagonal cavity 160 due to desirable mechanical interference. Of course the particular geometric shape associated with a particular preprogrammed time interval is a matter of convention, to be established according to user preference or the needs of a particular application.

Figure 3:
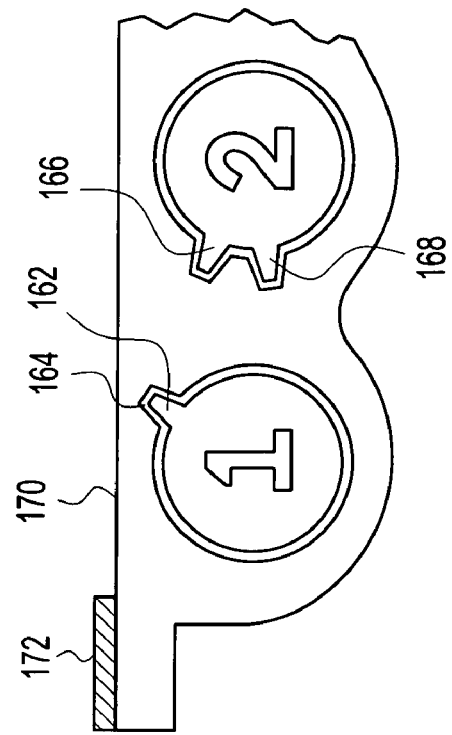
FIG. 3 shows, in schematic top view, a dispensing device and a bottle cap according to another aspect of the same invention.

FIG. 3 shows an alternative approach to selectively receiving a particularly programmed bottlecap within a particular dispensing cavity. As illustrated, a keyed interface may be established between the bottlecap and a receiving cavity by providing one or more of the bottlecap and the cavity with a protruding region, or key 162. A corresponding convex region, or slot 164 is provided to receive the protruding key, and the number and/or shape of the key and slot uniquely identifies a class of bottlecap to the particular receiving cavity.

In the illustrated embodiment, a single key 162 is provided for a bottlecap programed to annunciate once-per-day, whereas a pair of keys 166, 168 is provided to identify the bottlecap programed to annunciate twice-per-day. While a particular selection of key shape and/or pattern one may be chosen, as indicated here, for its mnemonic benefit, choice of pattern is, nevertheless, understood to be a matter for selection according to the needs of a particular application, and may be arbitrarily made.

One of skill in the art will appreciate that where convex and concave features of the bottlecap and dispensing device are described herewith, these may be exchanged with equal effect. Consequently, according to aspects of the invention, a kit may include a bottlecap having at least one of an identifying indicia on a bottlecap and an identifying device adapted to exclude the bottlecap from all but one area of a dispensing device. In this way a bottlecap having a preprogrammed time interval can be readily made available from a dispensing device according to that preprogrammed time interval.

Referring to FIG.'s 1-3 in certain embodiments, the dispensing device 101 includes a fixturing feature adapted to allow mounting of the dispensing device 101 on a wall, cabinet door, or other such substantially vertical surface. Thus, as illustrated in FIG. 1 an exemplary dispensing device includes one or more mounting brackets 132, 134. In certain embodiments, the mounting bracket includes, for example, a through hole adapted to receive screw, nail, or other fastener therethrough.

In a further aspect, as shown in FIG. 3, a dispensing device may include a supporting surface 170 adapted to be coupled to a fixturing device 172 such as, for example, a chemical adhesives, an adhesive tape, a magnet, or any other appropriate fixturing device. In certain aspects of the invention, the fixturing device is adapted to couple the dispensing device to a supporting surface of a wall or cabinet.

Figure 4:
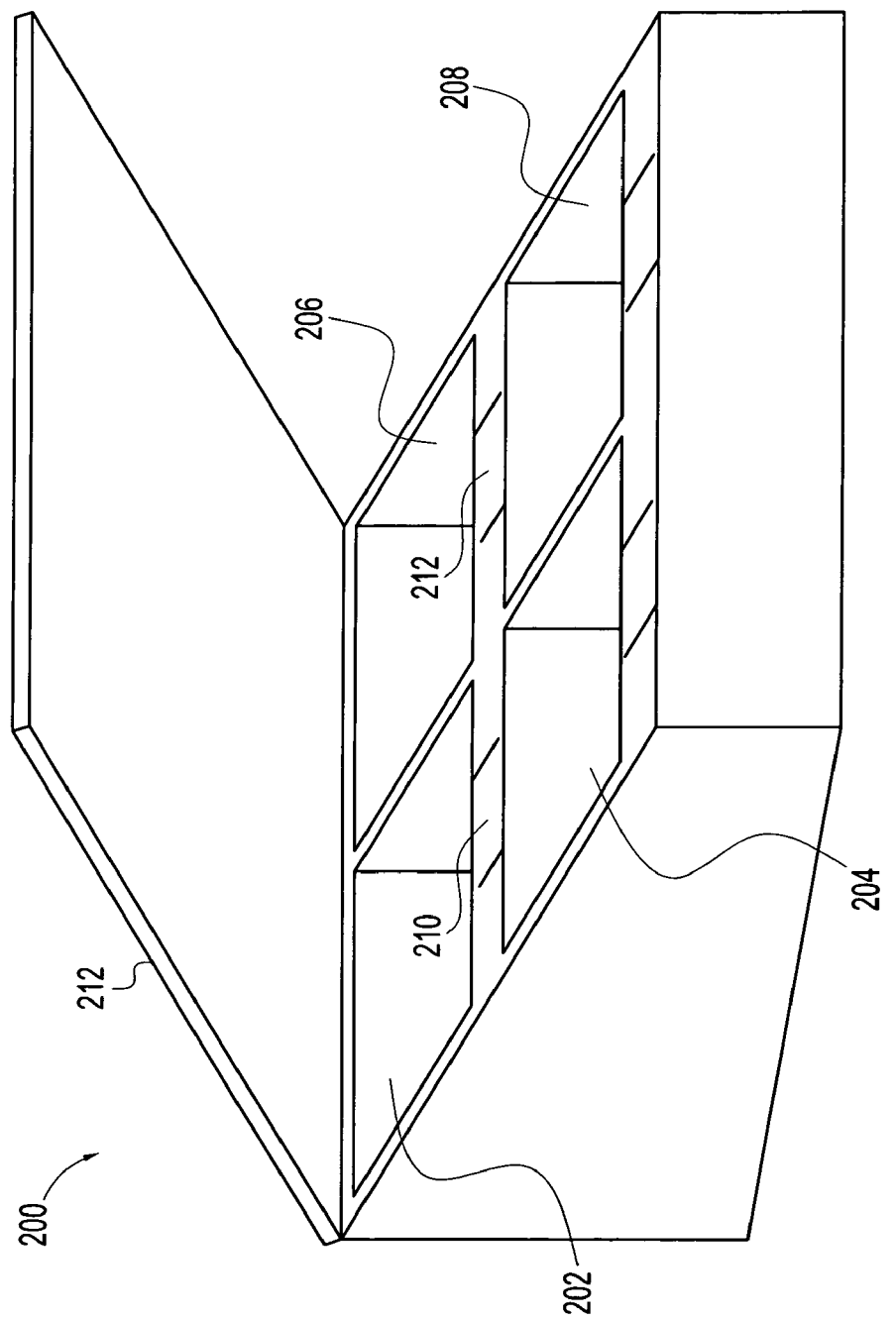
FIG. 4 shows, in schematic perspective view, a dispensing device according to a further aspect of the same invention.

FIG. 4 shows an alternative dispensing device 200 including a plurality of cavities 202, 204, 206, 208. According to certain aspects of the invention, each cavity is adapted to receive a particular class of, for example, bottle caps. Each class of bottlecap may include one or more bottle caps preprogrammed for a particular time interval. Alternately, each cavity may include a complete medicine bottle and bottlecap assembly for receiving, e.g., a pill, a liquid medicine, a powder or cream. In addition, each cavity may include a corresponding label e.g., 210, 212, indicating the dispensing interval for which the included bottle caps are preprogrammed. For example, according to certain aspects of the invention, exemplary cavity 202 is received including a plurality of bottle caps preprogrammed to annunciate on a once-per-day basis as correspondingly labeled. In certain aspects of the invention, a timer device is automatically or manually first made active upon removal from the dispensing device.

According to certain embodiments of the invention, dispensing device 200 may include a detecting an alarming device, such as an electronic detecting an alarming device, adapted to sound an alarm if a bottlecap is received within a cavity other than that for which it is preprogrammed. As would be understood by one of skill in the art, such alarm may be, for example, audible, visual, vibratory, or a combination of one or more of the same.

In certain aspects of the invention, the dispensing device 200 may include a lid 212. The lid may be, for example, hinged or removable, and is adapted to retain the contents of the cavities within their respective locations until removal is desirable.

Figure 5:
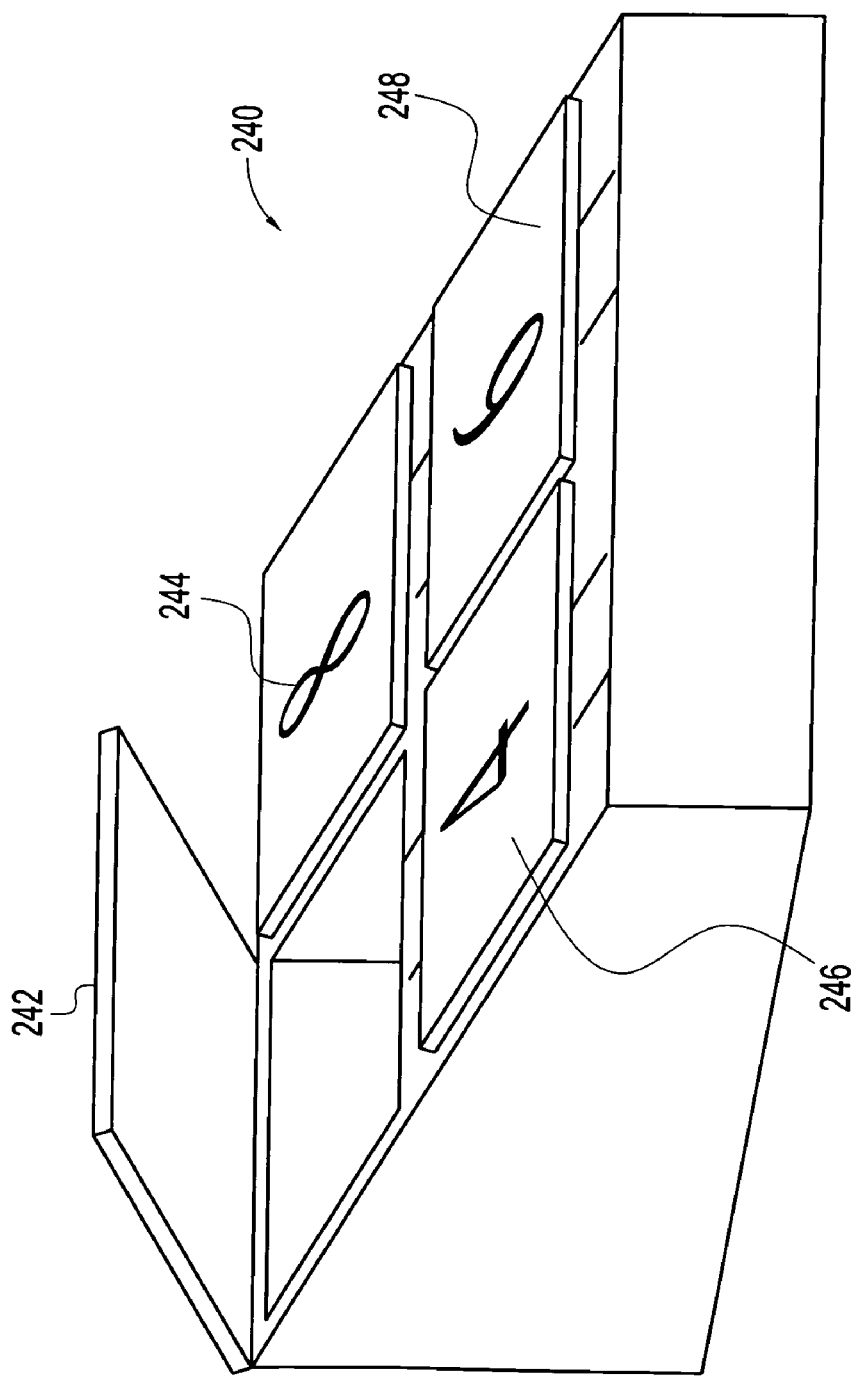
FIG. 5 shows, in schematic perspective view, a dispensing device according to another aspect of the same invention.

FIG. 5 shows another dispensing device 240 according to the invention. Like device 200, dispensing device 240 includes a plurality of cavities adapted to receive respective pluralities of preprogramed bottlecaps and/or bottles. The dispensing device 240 includes individual lids 242, 244, 246 and 248 adapted to cover respective cavities of the dispensing device 240. As indicated, the covers may include respective indicia showing the dispensing frequency and/or number of hours for which a particular group of bottlecaps is programed. In some aspects, having individual lids is adapted to reduce the opportunity for inadvertent removal of a lid other than the desired lid having a particular desired preprogrammed time interval.

Figure 6:
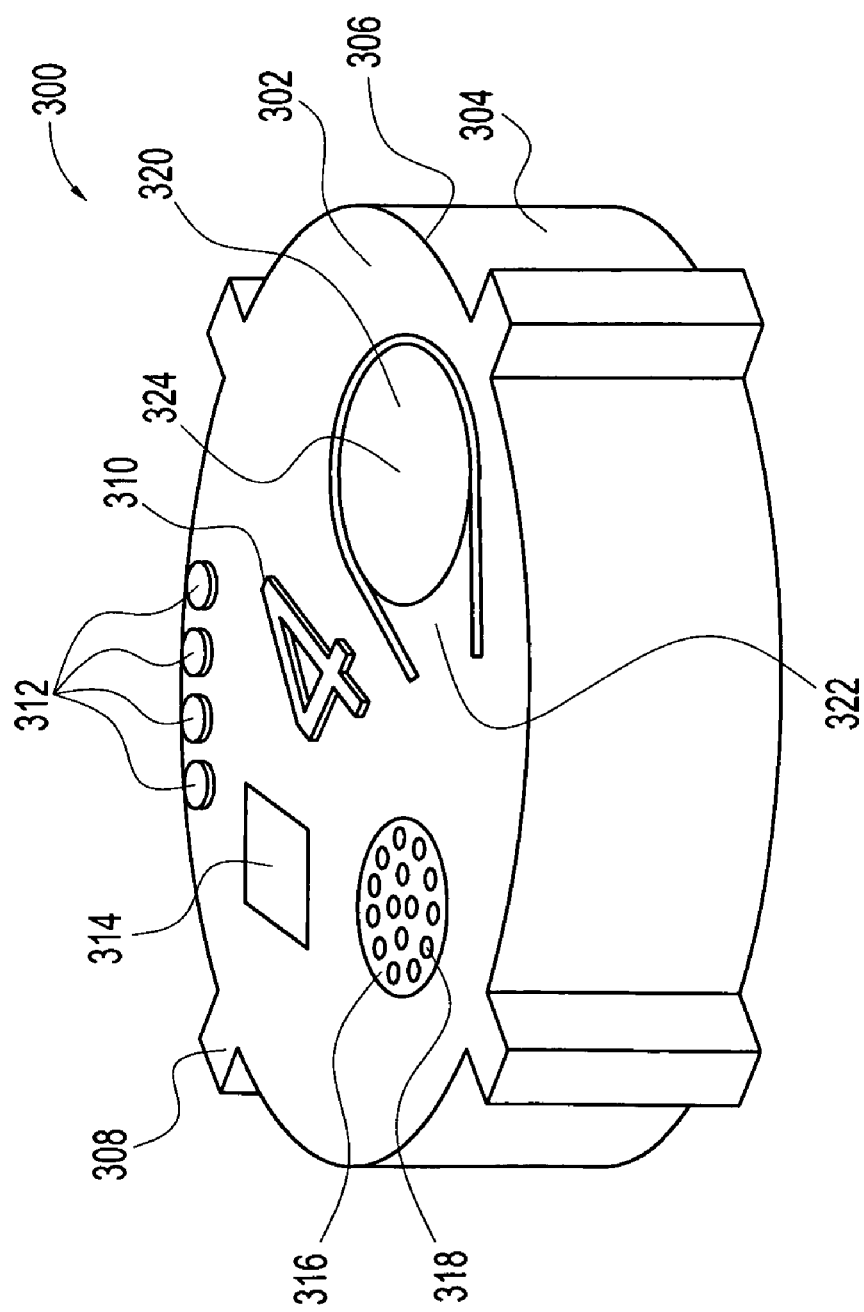
FIG. 6 shows, in schematic perspective view, a bottle cap according to a further aspect of the same invention.

FIG. 6 shows, in schematic perspective view, a bottlecap 300 according to one aspect of the invention. The bottlecap includes an upper surface region 302 and a peripheral skirt region 304. The skirt region 304 adjoins the upper surface region 302 at a substantially circular circumferential edge 306. As discussed above, however, the circumferential edge may have any of a wide variety of shapes according to preferences and requirements associated with a particular application.

A plurality of convex protrusions, or keys, e.g. 308, are illustrated protruding radially outward from the peripheral skirt region 304. In the illustrated bottlecap, four keys are shown. As noted above, however, different numbers, shapes and arrangement of keys are possible according to the requirements of a particular application. Alternately, one or more keyways can be included in a particular cap, with or without keys.

The exemplary bottlecap shown includes optional indicia showing, for example, the number of hours or the dispensing frequency at which the bottlecap is programmed to annunciate. Here the indicia include an Arabic numeral 310 and a plurality of raised protrusions 312. The Arabic numeral may be raised, flat or recessed depending on a particular application. The protrusions may be substituted in whole or in part by sensible depressions. In addition, color coding, barcoding, labeling and any other appropriate means may be used to indicate the preprogrammed status of a particular bottlecap to a user.

The illustrated bottlecap includes a region 314 adapted to illuminate as, for example, by a light emitting diode. In some embodiments, region 314 includes a transparent region adapted to allow passage of light from an underlying lighting device. In other embodiments, region 314 includes an embedded lighting device and it still other embodiments, region 314 includes an integrally formed lighting device.

Also included is a region 316 adapted to pass an audible signal. In certain embodiments, region 316 includes a plurality of through holes, e.g., 318 to facilitate the passage of sound waves from an underlying audio transducer. In other embodiments, region 314 includes an embedded audio transducer and in still other embodiments, region 314 includes an integrally formed audio transducer.

A bottlecap according to the invention may include one or more switching device is adapted to control operation of the bottlecap. Thus, bottlecap 300 includes a switching region 320. The switching region 320 is pivotally coupled to the upper surface 302 by a substantially flexible region 322. According to certain embodiments of the invention, switching region 320 includes a substantially concave surface region 324. In certain applications, such a concave surface region is useful inasmuch as it tends to prevent inadvertent application of force to the switching region 320.

While a single switching region is shown in the illustrated bottlecap, one of skill in the art will appreciate that a plurality of such switches may be provided to allow independent switching of such features as initially activating a timer of the bottlecap, resetting the timer of the bottlecap upon dispensing of a medicine dose, setting a "snooze timer" for a short-term delay of an annunciating alarm, and disabling annunciation when it has been noted, or when inactivation of the enunciating function is otherwise desirable.

Figure 7:
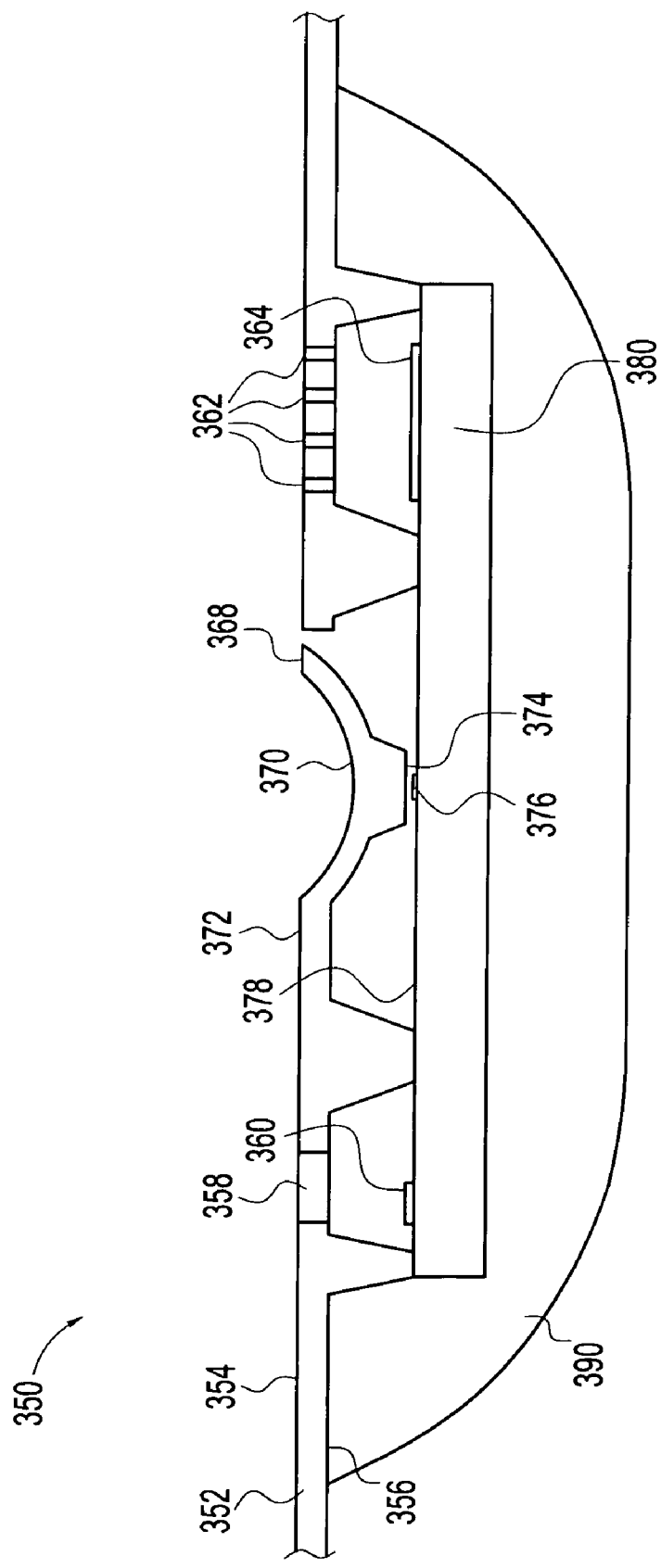
FIG. 7 shows in cross-section, a portion of a bottle cap according to a further aspect of the same invention.

FIG. 7 shows a portion of a bottlecap, in cross-sectional view according to certain aspects of the invention. Among the features illustrated are a surface member 352 including an upper surface region 354 and a lower surface region 356. The service member includes, in the illustrated embodiment, a transparent region 358 adapted to pass a light signal from an underlying light emitting diode 360. One or more through holes 362 is disposed between upper surface region 354 and lower surface region 356. The holes are adapted to convey an audio signal produced by an underlying audio transducer 364 through member 352.

A switching element 368 having a concave surface region 370 is pivotally coupled to member 352 by a substantially flexible region 372. The switching element 368 includes a lower surface region 374 adapted to actuate an underlying switching device 376.

In certain embodiments of the invention, light emitting diode 360, audio transducer 364 and switching device 376 are respectively coupled to an upper surface 378 of a substrate 380 such as a printed circuit board. In certain embodiments of the invention, the substrate also supports a timing device such as, for example, an electronic integrated circuit timing device.

In still other embodiments of the invention, the substrate 380 includes a semiconductor substrate and one or more of the electronic integrated circuit timing device, the light emitting diode 360, the audio transducer 354 and the switching device 376 are integrally formed with the semiconductor substrate. According to certain aspects of the invention, electric cattle devices such as the switching device 376 an audio transducer 354 are formed by microelectronic mechanical systems (MEMS) technology, as is known, or may become known, in the art. In certain embodiments of the invention, an encapsulating adhesive material 390 is provided to couple the substrate 380 to surface region 356.

One of skill in the art will appreciate that while both audio and visual stimuli transducers are provided in the above-illustrated embodiments, any appropriate annunciation means, including, for example radiofrequency or near-field annunciation means such as Bluetooth annunciation also falls within the scope of the invention.

Figure 8:
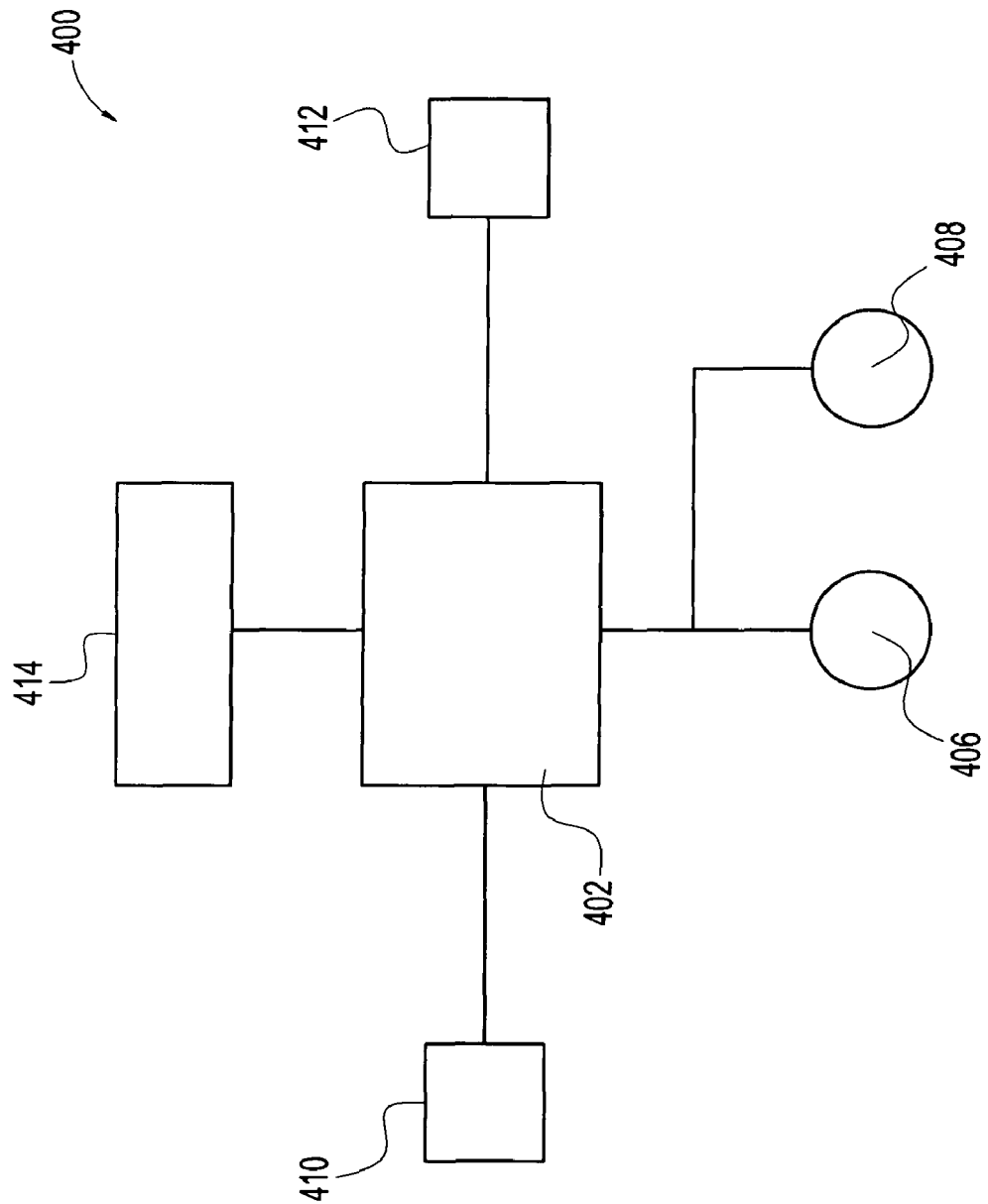
FIG. 8 shows, in block diagram form, a portion of a bottle cap according to a further aspect of the same invention.

FIG. 8 shows, in block diagram form, a timing device 400 for inclusion in the bottlecap according to certain aspects of the invention. In the illustrated embodiment, the timing device 400 includes an electronic timer device such as an electronic integrated circuit timer device 402. The timer device 402 is signalingly coupled to an optical transducer such as, for example an LED 404. The timer 402 is also signalingly coupled to an audio transducer such as, for example, a MEMS audio transducer 406. In addition, the timer device 402 is signalingly coupled to a start switch device 410 and a stop switch device 412. Also, as shown, in an exemplary embodiment the timer device 402 is electronically coupled to a power source device 414 such as electrochemical storage battery, a capacitive device, or a power receiver device. In certain other embodiments, the timer device 402 may be coupled to, for example, a transducer device such as a radio frequency antenna, a near feel frequency antenna, and/or an optical transducer device, for presentation of an alarm signal or for programming signals to and from the timer device 402.

In various additional aspects, the invention includes a timer that can be easily adhered to a bottlecap or bottle and incorporates any or all of the above-discussed functions. Thus a timer according to the invention can be adapted for use with any existing bottle or other enclosure. In certain aspects of the invention the timer device includes a pre-attach adhesive device such as, for example, a double-sided tape adhesive device.

In certain aspects, a bottlecap according to the invention includes a semiconductor device embedded within a bulk material of the bottlecap, such as, for example, a microchip embedded in a plastic cap material.

In certain aspects, the invention includes a pushbutton adapted to restart a program of the timer device. According to certain aspects of the invention, the device will he knowledge that the pushbutton has been pushed by activating a buzzer and/or an LED device. In certain aspects of the invention the same pushbutton can be used to set a time interval of the device. In certain embodiments, a time interval of one week is contemplated.

According to one embodiment of the invention, a timer will acknowledge the setting of a time interval by blinking the LED four the option selected such that one blink indicates a 12 hour time interval, two links indicates an eight hour time interval, three links indicates a six-hour time interval and four blinks indicates a four hour time interval. In certain embodiments, the time interval cannot be reset once the interval has been established.

In a further aspect of the invention, a timer will indicate the expiration of a time interval by flashing an LED and sounding a buzzer. In certain aspects these actions will repeat on a 60 second time interval until the button is pressed or for a certain time interval (e.g., two or three minutes). In certain embodiments, after the two or three minute time interval has elapsed, the LED will blink once every four minutes until the reset button is pressed.

While the exemplary embodiments described above have been chosen primarily from the field of medical dispensing, one of skill in the art will appreciate that the principles of the invention are equally well applied, and that the benefits of the present invention are equally well realized in a wide variety of other dispensing systems including, for example, veterinary dispensing systems and feeding systems. Further, while the invention has been described in detail in connection with the presently preferred embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Accordingly, the invention is not to be seen as limited by the foregoing description, but is only limited by the scope of the appended claims.

The invention claimed is:
1. A dispensing kit for medicine bottlecaps comprising:
a first bottlecap, said first bottlecap including a first timer device, said timer device being preprogrammed to indicate an expiration of a first time interval;
a second bottlecap, said second bottlecap including a second timer device, said second timer device being pre- programmed to indicate an expiration of a second time interval, said second time interval being different from said first time interval; and a dispensing device, said dispensing device being adapted to receive said first bottlecap in a first dispensing region and to receive said second bottlecap and a second dispensing region thereof, and to individually dispense said first and second bottlecaps.

2. A dispensing kit as defined in claim 1 wherein said first dispensing region is adapted to receive said first bottlecap and to exclude said second bottlecap and said second dispensing region is adapted to receive said second bottlecap and to exclude said first bottlecap.

3. A dispensing kit as defined in claim 1 wherein said first bottlecap includes a mechanical interference device adapted to inhibit its insertion in said second dispensing region and said second bottlecap includes a mechanical interference device adapted to inhibit its insertion in said first dispensing region.

4. A dispensing kit as defined in claim 1 wherein said first bottlecap includes an electronic device adapted to inhibit its insertion in said second dispensing region and said second bottlecap includes an electronic device adapted to inhibit its insertion in said first dispensing region.

5. A dispensing kit as defined in claim 1 wherein said first bottlecap comprises:
   an electronic timer device;
   an annunciator device; and
   a switching device adapted to temporarily disable an activity of said annunciator device.

6. A dispensing kit as defined in claim 5 wherein said electronic timer device is preprogrammed to activate said annunciator device at a time interval selected from the group of once per day, twice per day, three times per day, four times per day, five times per day, six times per day, and twelve per day.

7. A dispensing kit as defined in claim 5 wherein said electronic timer device is preprogrammed to activate said annunciator device at a time interval selected from the group of every hour, every two hours, every three hours, every four hours, every five hours, every six hours, every seven hours, every eight hours, every nine hours, every 10 hours, every 11 hours, every 12 hours, every 13 hours, every 14 hours, every 15 hours, every 16 hours, every 17 hours, every 18 hours, every 19 hours, every 20 hours, every 21 hours, every 22 hours, every 23 hours, every 24 hours, every two days, every three days, every four days, every five days, every six days, every seven days, every two weeks, every three weeks, every four weeks, and every five weeks.

8. A dispensing kit as defined in claim 1 wherein said first bottlecap includes an audio transducer device.

9. A dispensing kit as defined in claim 1 wherein said first bottlecap includes a Bluetooth transmitter device.

10. A dispensing kit as defined in claim 1 wherein said first bottlecap includes an Arabic numeral indicating said first time interval.

11. A dispensing kit as defined in claim 1 wherein said first dispensing region comprises a substantially cylindrical region.

12. A dispensing kit as defined in claim 11 wherein said substantially cylindrical region is defined by a substantially circular cylindrical inner wall having a keyway therein.

13. A dispensing kit as defined in claim 11 wherein said substantially cylindrical region is defined by a substantially polygonal inner wall, and wherein said first bottlecap includes a corresponding substantially polygonal skirt region.

14. A dispensing kit as defined in claim 1 wherein said first preprogrammed bottlecap is adapted to be preprogrammed at an integrated circuit manufacturing facility.

15. A dispensing kit as defined in claim 1 wherein said first preprogrammed bottlecap is adapted to be preprogrammed at a bottlecap manufacturing facility.

16. A dispensing kit as defined in claim 1 wherein said first preprogrammed bottlecap is adapted to be preprogrammed at a dispensing pharmacy facility.

\* \* \* \* \*